(12) United States Patent
Chinnappan et al.

(10) Patent No.: US 7,555,447 B2
(45) Date of Patent: *Jun. 30, 2009

(54) SYSTEM AND METHOD FOR IDENTIFYING A PRODUCT

(75) Inventors: Mohanasundaram Chinnappan, Nashua, NH (US); Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 435 days.

This patent is subject to a terminal disclaimer.

(21) Appl. No.: 11/099,859

(22) Filed: Apr. 6, 2005

(65) Prior Publication Data

US 2005/0197926 A1 Sep. 8, 2005

Related U.S. Application Data

(63) Continuation of application No. 09/746,120, filed on Dec. 22, 2000, now abandoned.

(60) Provisional application No. 60/235,945, filed on Sep. 26, 2000.

(51) Int. Cl.
*G06Q 30/00* (2006.01)
(52) U.S. Cl. .............................. 705/27; 705/26; 705/16; 705/23
(58) Field of Classification Search ............... 705/26, 705/27, 16, 23
See application file for complete search history.

(56) References Cited

U.S. PATENT DOCUMENTS

| | | | |
|---|---|---|---|
| 3,961,164 A | 6/1976 | Reed et al. | |
| 5,347,632 A | 9/1994 | Filepp et al. | |
| 5,551,027 A | 8/1996 | Choy et al. | |
| 5,564,043 A | 10/1996 | Siefert | |
| 5,721,832 A | 2/1998 | Westrope et al. | |
| 5,727,129 A | 3/1998 | Barrett et al. | |
| 5,777,608 A | 7/1998 | Lipovski et al. | |
| 5,918,229 A | 6/1999 | Davis et al. | |
| 5,926,797 A | 7/1999 | Goodwin, III | |
| 5,935,207 A | 8/1999 | Logue et al. | |
| 5,950,169 A * | 9/1999 | Borghesi et al. | ............... 705/4 |
| 5,963,134 A | 10/1999 | Bowers et al. | |
| 5,970,471 A | 10/1999 | Hill | |
| 5,983,309 A | 11/1999 | Atsatt et al. | |

(Continued)

OTHER PUBLICATIONS

Ford Mustang Service Manual, 1991, 2pgs.*

(Continued)

*Primary Examiner*—Robert M. Pond
(74) *Attorney, Agent, or Firm*—Booth Udall, PLC; Steven J. Laureanti

(57) ABSTRACT

A product that is uniquely identifiable according to a globally unique identifier (GUID)(100) includes a class identifier (CID)(110) that uniquely identifies at least one product class in which the product is categorized (along with a plurality of other products) within a class hierarchy of a global content directory (42). The product class defines one or more attributes of the products categorized in the class. The product also includes a product identifier (PID)(120) that uniquely identifies the particular product from among the plurality of products categorized in the product class uniquely identified by the CID (110). The CID (110) and PID (120) collectively provide the GUID (100), which may be specified or determined to facilitate a commercial transaction involving the product.

32 Claims, 5 Drawing Sheets

U.S. PATENT DOCUMENTS

| | | | |
|---|---|---|---|
| 5,987,233 | A | 11/1999 | Humphrey |
| 5,991,115 | A | 11/1999 | Chainer et al. |
| 6,006,218 | A | 12/1999 | Breese et al. |
| 6,016,493 | A | 1/2000 | Burrows |
| 6,038,668 | A | 3/2000 | Chipman et al. |
| 6,078,891 | A * | 6/2000 | Riordan et al. ............... 705/10 |
| 6,101,515 | A | 8/2000 | Wical et al. |
| 6,128,600 | A | 10/2000 | Imamura et al. |
| 6,128,624 | A | 10/2000 | Papierniak et al. |
| 6,144,996 | A | 11/2000 | Starnes et al. |
| 6,154,738 | A | 11/2000 | Call |
| 6,189,043 | B1 | 2/2001 | Buyukkoc et al. |
| 6,212,512 | B1 | 4/2001 | Barney et al. |
| 6,236,978 | B1 | 5/2001 | Tuzhilin |
| 6,271,846 | B1 | 8/2001 | Martinez et al. |
| 6,285,366 | B1 | 9/2001 | Ng et al. |
| 6,286,002 | B1 | 9/2001 | Axaopoulos et al. |
| 6,289,382 | B1 | 9/2001 | Bowman-Amuah |
| 6,324,522 | B2 | 11/2001 | Peterson et al. |
| 6,334,131 | B2 | 12/2001 | Chakrabarti et al. |
| 6,341,280 | B1 | 1/2002 | Glass et al. |
| 6,343,287 | B1 | 1/2002 | Kumar et al. |
| 6,356,899 | B1 | 3/2002 | Chakrabarti et al. |
| 6,366,910 | B1 | 4/2002 | Rajaraman et al. |
| 6,370,527 | B1 | 4/2002 | Singhal |
| 6,415,320 | B1 | 7/2002 | Hess et al. |
| 6,460,038 | B1 | 10/2002 | Khan et al. |
| 6,466,240 | B1 | 10/2002 | Maslov |
| 6,466,918 | B1 | 10/2002 | Spiegel et al. |
| 6,470,344 | B1 | 10/2002 | Kothuri et al. |
| 6,489,968 | B1 | 12/2002 | Ortega et al. |
| 6,490,567 | B1 | 12/2002 | Gregory |
| 6,490,619 | B1 | 12/2002 | Byrne et al. |
| 6,553,364 | B1 | 4/2003 | Wu |
| 6,581,072 | B1 | 6/2003 | Mathur et al. |
| 6,591,252 | B1 | 7/2003 | Young |
| 6,708,161 | B2 | 3/2004 | Tenorio et al. |
| 6,745,177 | B2 | 6/2004 | Kepler et al. |
| 2001/0016846 | A1 | 8/2001 | Chakrabarti et al. |
| 2001/0034814 | A1 | 10/2001 | Rosenzweig |
| 2001/0044751 | A1 | 11/2001 | Pugliese, III et al. |
| 2002/0026386 | A1 | 2/2002 | Walden |
| 2002/0032597 | A1 | 3/2002 | Chanos |
| 2002/0046187 | A1 | 4/2002 | Vargas et al. |
| 2002/0082932 | A1 | 6/2002 | Chinnappan et al. |
| 2002/0082945 | A1 | 6/2002 | Tenorio |
| 2002/0123955 | A1 | 9/2002 | Andreski et al. |
| 2002/0147704 | A1 | 10/2002 | Borchers |
| 2003/0033205 | A1 | 2/2003 | Nowers et al. |
| 2003/0167213 | A1 | 9/2003 | Jammes et al. |
| 2003/0195877 | A1 | 10/2003 | Ford et al. |

OTHER PUBLICATIONS

Unknown, "eBay—Your Personal Trading Community," http://web.archieve.org/web/19990117033159/pages.ebay.com/aw/index.html, About eBay, safeHarbor, Bookmarks eBay S, May 23, 2003.

Unknown, "Welcome to Amazon.com," Amazon.com-Earth's Biggest Selection, http://web.archive.org/web/19991013091817/http://amazon.com, 6pgs. Internet Date May 23, 2003.

Unknown, "Northern Light Search," http://web.archive.org/web/19980206192654/http://www.northernlight.com, 18pgs,Internet Date May 28, 2003.

Tracy Marks, "Lesson Two: My Computer and Explorer continued, G. Explorer: Orientation," Windows 95 Manual, L:2, Copying, http://www.windweaver.com/w95man2g.htm, 4pgMay 23, 2003.

Unknown, Sample Full Hit Highlighting Form, Query i2 against document http://www.industryweek.com/iissamples/isamples/oop/qfullhit.htw?CiWebHitsFile=%2Fnews, 2pgsDec. 31, 2001.

Unknown, Sample Full Hit Highlighting Form, Query tradematrix again http://www.industryweek.com/iissamples/isamples/oop/qfullhit.htw?CiWebHitsFile=%2Fcolum, 2pgsDec. 31, 2001.

Notification of Transmittal of the international Search Report or the Declaration, 4 pages, Dec. 31, 2001.

PCT, Notification of Transmittal of the International Search Report or the Declaration, 3 pages, Dec. 28, 2001.

PCT, Notification of Transmittal of the International Search Report or the Declaration, 3 pages, Dec. 31, 2001.

Unknown, "UDDI Technical White Paper," Universal Description, Discovery and Integration, uddi.org, IBM Corporation adn Microsoft Corporation, 13 pages, Sep. 6, 2000.

Unknown, "website2go Commerce User Guide, Shopping Cart Online Help," webshop2go User http://web.archive.org/web/20000824163512/http://shopguide.website2go.com, 2pgs, May 27, 2003.

Unknown, "1998-99 Database Seminar ," Uoft Data Base Group, Database Seminar, http://www.cs.toronto.edu/DB/main/seminars98.html, 4pgs, May 27, 2003.

Unknown, Pars Int. parleys its sales automation strengths into E-Commerce leadership using Java and IBM SF, http://www.pars.com/ultra/IBMPressRelease.htm, 3pgs, May 27, 2003.

Unknown, "ONYX Internet Ltd, The Challenge, "eBusiness Inn. Awards 99, http://www.ecommerce-awards.com/awards.com/awards2000/winners/1998/finalists/onyx.html, 2pgs May 28, 2003.

* cited by examiner

FIG. 5

| PID | PRODUCT TYPE | MANUFACTURER | INK COLOR | TIP SIZE | ... | PRICE |
|---|---|---|---|---|---|---|
| 23 | BALL POINT | ABC | BLUE | MEDIUM | ... | 0.12 |
| 29 | BALL POINT | ABC | BLACK | MEDIUM | ... | 0.12 |
| 56 | BALL POINT | XYZ | BLACK | MEDIUM | ... | 0.13 |
| 98 | BALL POINT | XYZ | GREEN | MEDIUM | ... | 0.13 |
| ... | ... | ... | ... | ... | ... | ... |
| 12 | FELT TIP | XYZ | BLACK | BROAD | ... | 0.17 |
| 16 | FELT TIP | ABC | BLACK | BROAD | ... | 0.18 |
| 56 | FELT TIP | ABC | RED | FINE | ... | 0.16 |
| 123 | FELT TIP | XYZ | RED | FINE | ... | 0.16 |
| ... | ... | ... | ... | ... | ... | ... |
| 2 | ROLLER BALL | XYZ | BLUE | FINE | ... | 0.25 |
| 59 | ROLLER BALL | XYZ | BLACK | FINE | ... | 0.25 |
| 143 | ROLLER BALL | XYZ | BLACK | MEDIUM | ... | 0.22 |
| 456 | ROLLER BALL | ABC | RED | EXTRA FINE | ... | 0.29 |
| ... | ... | ... | ... | ... | ... | ... |

SYSTEM AND METHOD FOR IDENTIFYING A PRODUCT

RELATED APPLICATIONS

This application is a Continuation of U.S. patent application Ser. No. 09/746,120 filed on Dec. 22, 2000 now abandoned entitled "Systems and Methods for Identifying a Product," the entire contents of which are hereby incorporated by reference, and which claims the benefit under 35 U.S.C. § 119(e) of U.S. Provisional Application Ser. No. 60/235,945 filed Sep. 26, 2000 entitled "LDAP Based Global Content Directory and Globally Distributed Content Services."

CROSS-REFERENCE TO RELATED APPLICATIONS

This application is related to U.S. application Ser. No. 09/745,374 entitled "System and Method for Migrating Data in an Electronic Commerce System," which was filed on Dec. 22, 2000 by Noel Tenorio; U.S. application Ser. No. 09/745,980 entitled "System and Method for Selective Database Indexing," which was filed on Dec. 22, 2000 by Noel Tenorio, et al.; and U.S. application Ser. No. 09/745,978 entitled "System and Method for Facilitating Electronic Commerce Transactions," which was filed on Dec. 22, 2000 by Mohanasundaram Chinnappan, et al.

TECHNICAL FIELD OF THE INVENTION

This invention relates to the field of electronic commerce, and more particularly to a system and method for identifying a product.

BACKGROUND OF THE INVENTION

Due to the ever-increasing popularity and accessibility of the Internet as a medium of communication between people around the world, the number of business transactions (or "e-commerce") conducted using the Internet is also exponentially increasing. The majority of e-commerce transactions occur when a buyer determines a need for a product, identifies a seller that provides that product, and accesses the seller's web site to arrange a purchase of the product. If the buyer does not have a preferred seller or if the buyer is purchasing the product for the first time, then the buyer will often perform a search for a number of sellers that offer the product and then access numerous seller web sites to determine which seller offers certain desired product features at the best price. The multiple one-to-one (one buyer to one seller) searches that this process requires are inefficient because of the large amount of searching involved in finding a product and because once a particular product is found, the various offerings of that product by different sellers may not be easily compared.

SUMMARY OF THE INVENTION

According to the present invention, disadvantages and problems associated with previous electronic commerce systems and methods have been substantially reduced or eliminated.

According to one embodiment of the present invention, a product that is uniquely identifiable according to a globally unique identifier (GUID) includes a class identifier (CID) that uniquely identifies at least one product class in which the product is categorized (along with a plurality of other products) within a class hierarchy of a global content directory. The product class defines one or more attributes of the products categorized in the class. The product also includes a product identifier (PID) that uniquely identifies the particular product from among the plurality of products categorized in the product class uniquely identified by the CID. The CID and PID collectively provide the GUID, which may be specified or determined to facilitate a commercial transaction involving the product.

According to another embodiment of the present invention, a global content directory includes a directory structure that includes a number of product classes organized in a hierarchy. Each product class categorizes a number of products and defines one or more attributes of the products. Each product class is uniquely identified by a class identifier (CID). The global content directory also includes one or more pointers that are associated with each product class. Each pointer identifies a seller database in which product data enabling a product transaction is stored for products associated with the product class. The global content directory further includes a search interface that communicates, in response to a selection of a product class by a user of the global content directory, a search query for product data to seller databases identified by the pointers associated with the selected product class. The search interface also receives, in response to the search query, search results including one or more product identifiers (PIDs) that each uniquely identify a particular product in the selected product class. The CID for the selected product class and the PID for a particular product collectively provide a globally unique identifier (GUID) for the particular product.

According to yet another embodiment of the present invention, a method for conducting a commercial transaction involving a product includes communicating a globally unique identifier (GUID) for a particular product to a seller of the particular product. The GUID includes a class identifier (CID) that uniquely identifies at least one product class in which the product is categorized (along with a plurality of other products) within a class hierarchy of a global content directory. The product class defines one or more attributes of the products categorized in the class. The GUID also includes a product identifier (PID) that uniquely identifies the particular product from among the plurality of products categorized in the product class uniquely identified by the CID. The method further includes specifying to the seller a desired commercial transaction involving the particular product uniquely identified by the GUID.

The systems and methods of the present invention provide a number of important technical advantages. Embodiments of the present invention provide a global content directory that provides access to data concerning vast numbers of products. Therefore, a buyer may search for a product using the global content directory and the need for the buyer to search numerous sellers to find the desired product is reduced or eliminated. The global content directory provides access to data concerning these numerous products using a directory structure that organizes products using a hierarchical, object-oriented classification system. A buyer may navigate or search the directory to find a particular classification of products and various information associated with the products within this classification, initiate a search of databases including data relating to a product, and then communicate with an appropriate database. This access to vast numbers of products is provided without the requirement that all data about the products be stored in a global database (which would greatly decrease performance). Instead the product data may be stored in seller databases that can be readily accessed from the global content directory. Furthermore, the global content directory may direct buyers to sellers so that so that once the buyer finds a desired product, a transaction for the product may be completed.

Certain embodiments of the present invention also provide a numbering system that is based on the hierarchical structure of the global content directory. This numbering system provides a globally unique identifier (GUID) for each product in the global content directory. This GUID may include elements that identify one or more hierarchical classifications of the global content directory in which a product is included and may be used to identify features of the product. In addition, a GUID (or an associated identifier) may be used to indicate the source of a product. Therefore, a buyer may use a GUID to identify a product and to request information or additional transactions from the source of the product.

Furthermore, embodiments of the present invention also provide techniques for enhancing the performance of the global content directory and the associated seller databases. One such technique is to provide for the migration and caching or other storage of selected product data associated with one or more sellers. The product data is cached or otherwise stored at one or more nodes in a network, such as the Internet, that is used to coupled the buyers, sellers, and the global content directory. Since the global content directory may direct a buyer to a seller of a particular product once the buyer has identified the product using the global content directory, it may be advantageous to migrate and cache or otherwise store product data that enables a transaction between the buyer and seller at a location near the buyer. Therefore, the cost and efficiency of completing the transaction are reduced. This product data migration may be performed dynamically at the direction of the global content directory to locate product data nearer a buyer or buyers that frequently need to access the product data.

The performance of global content directory may also be enhanced using selective, dynamic indexing of one or more seller databases associated with the global content directory. Although the indexing of data in a database often increases the speed at which data may be read from the database, such indexing also typically slows the updating or writing of data to the database. Therefore, the overall performance of global content directory may be enhanced by selectively indexing certain product data in the seller databases to optimize both reading and writing of product data. Embodiments of the present invention may determine whether to index a particular type of data in a database based on the frequency with which that data is read on behalf of buyers and the frequency with which that data is updated by sellers (as well as the time taken for reading and updating the data). This determination may be made individually for each type of data and may be dynamic to account for changes in these frequencies.

Systems and methods incorporating one or more of these or other technical advantages are well suited for modern electronic commerce environments. Other technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 5 illustrates an exemplary table that may be included in a seller database of an electronic commerce system.

DETAILED DESCRIPTION OF THE INVENTION

Figure 1:
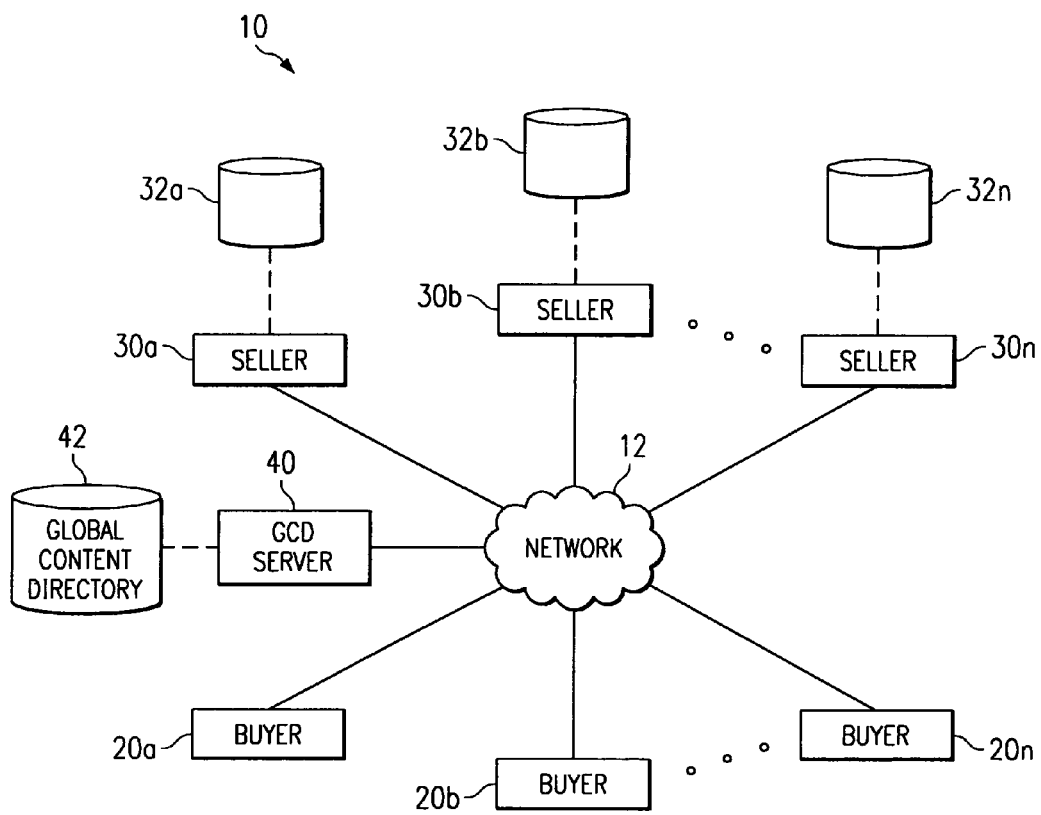
FIG. 1 illustrates an exemplary electronic commerce system.

FIG. 1 illustrates an exemplary electronic commerce ("e-commerce") system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. Network 12 may include any appropriate combination of public and private networks coupling buyers 20, sellers 30, and GCD server 40. In an exemplary embodiment, network 12 includes the Internet and any appropriate local area networks or wide area networks coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 of system 10. However, the use of the term "global" should not be interpreted as a geographic limitation necessarily requiring that GCD 42 provide directory services to buyers 20 and sellers 30 around the world or that the content of GCD 42 be from all over the world.

It should be noted that although buyers 20 and sellers 30 are illustrated as separate entities, a buyer 20 in one transaction may be a seller 30 in another transaction (and a seller 30 in one transaction may be a buyer 20 in another transaction). The terms "buyer" and "seller" may be used to refer to an individual or entity involved in a transaction and/or the computer (s) used by that individual or entity to conduct the transaction. Furthermore, although the terms "buyer" and "seller" are used, the present invention applies to any appropriate type of e-commerce transactions and is not limited to the sale of goods, services, or other items.

Although a buyer 20 may have a need for a "product" (meaning all goods, services, information, and other tangible or intangible items that may be the subject of any appropriate type of transaction) and multiple sellers 30 may provide that product, there are many steps that must occur before a transaction involving the product may be completed. These steps may include, but are not limited to: (1) the cataloging of products and product features by sellers 30, (2) the matching of a buyer's demands to one or more products of one or more sellers 30 (through the searching of seller catalogs), (3) the identification of commercial information (such as price) related to a product, (4) the connection of the buyer 20 to a potential seller 30, (5) the agreement of what seller 30 is to provide buyer 20, (6) the negotiation of a price, (7) the legal settlement of the transaction, and (8) the arrangement of logistics to physically complete the transaction.

The first three steps above may be grouped into what may be referred to as the "discovery" phase of a transaction. In the discovery phase of many typical e-commerce transactions, a buyer 20 performs a search for a number of sellers 30 that offer a desired product and then accesses numerous seller web sites to determine which seller 30 offers certain desired features of the product at the best price. Sellers 30 may each provide one or more databases 32, such as relational databases, that include data identifying the seller's products and their features. Such databases 32 may be accessed through each seller's web site or in any other appropriate manner. The multiple one-to-one (one buyer 20 to one seller 30) searches that this process requires are inefficient and expensive because of the large amount of searching involved in finding a product and because once a particular product is found, the various offerings of that product by different sellers may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, then buyer 20 may have to go to several different types of marketplaces. Furthermore, there may be numerous competing marketplaces that buyer 20 has to search to perform the discovery phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the database content (such as product data, which may include an identifier of the product, descriptions of product features; information enabling a transaction relating to a product, or any other appropriate data or information) is stored in databases 32, but all of this content is accessible using GCD 42. Therefore, like the global database described above, GCD 42 provides buyers 20 with access to product data relating to a multitude of products, but unlike the global database, GCD 42 does not attempt to store all of this product data in one enormous database. Instead, GCD 42 provides a directory of products using a directory structure in which products are organized using an hierarchical, object-oriented classification system (a "taxonomy"). A buyer 20 may navigate or search the directory to find a particular product and product data associated with the product. After a certain point of specificity, the product data associated with a product may actually be stored in and obtained by GCD 42 from a seller database 32. However, the requested product data may be transparently provided to buyer 20 such that all of the product data may appear to buyer 20 as being included in GCD 42.

Figure 2:
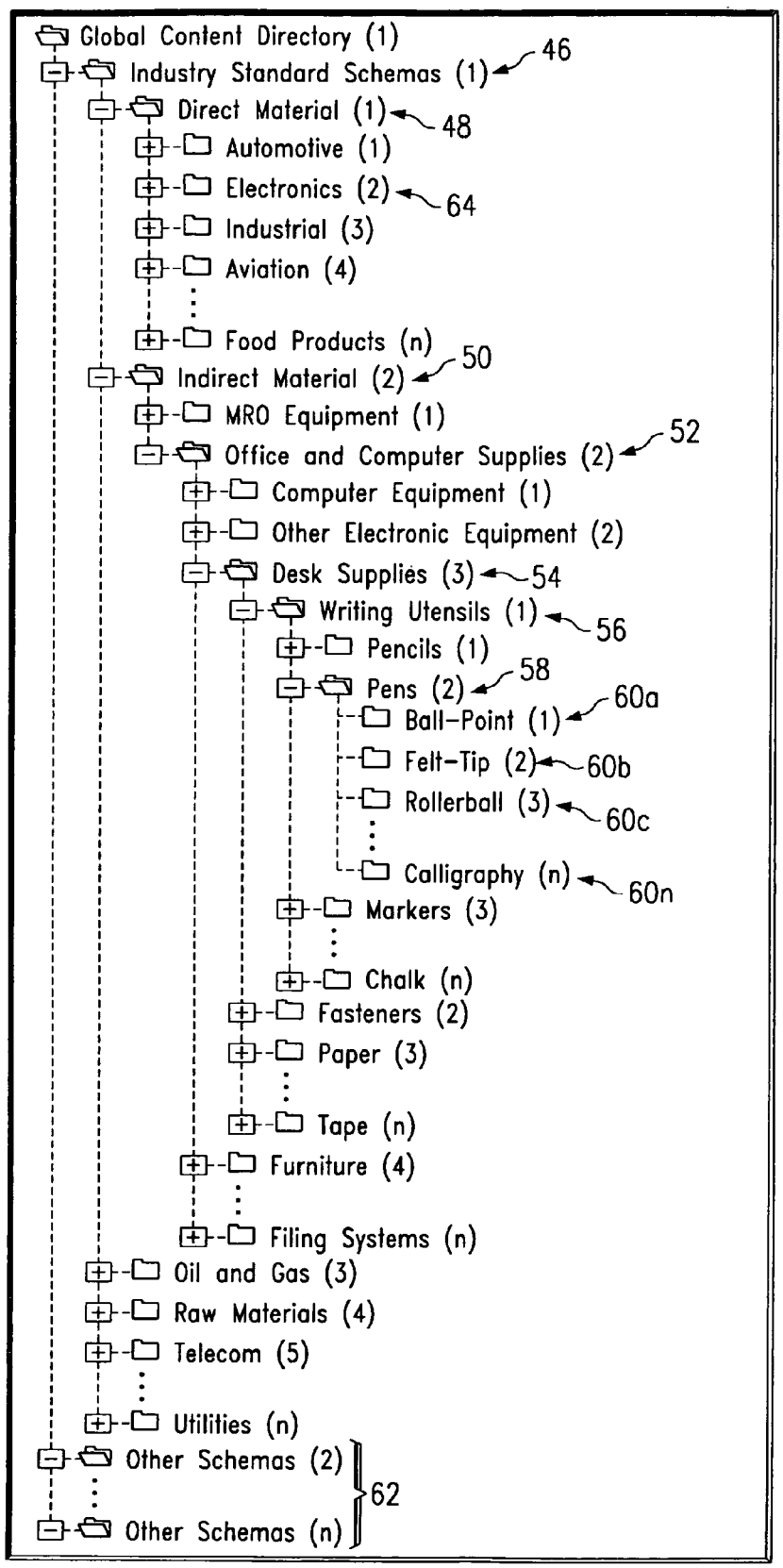
FIG. 2 illustrates an exemplary directory structure of an exemplary global content directory.

FIG. 2 illustrates an exemplary directory structure 44 of an exemplary GCD 42. Products categorized in GCD 42 may be organized according to schemas. A schema may include the various classes into which a product is categorized (which may be referred to as "taxonomy") and the various features used to organize products in a particular class (which may be referred to as "ontology"). In exemplary directory structure 44, products may be organized and cataloged according to industry standard schemas 46 or other appropriate schemas, as described below. Within industry standard schemas 46, there are two exemplary classes: a direct materials class 48 and an indirect materials class 50. Each of these classes 48 and 50 includes several sub-classes which may themselves include sub-classes). Therefore, the numerous classes of directory structure 44 form a "tree-like" hierarchical structure into which products may be categorized.

For exemplary purposes, certain portions of directory structure 44 are "expanded" to show various levels of classes. The "level" of a class is indicated by the number of other classes between that a class and a root class (for example, industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes $60a$-$60n$ ("n" indicating that any number of classes 60 may be included in pens class 58). Each of classes 50, 52, 54, 56, 58 and 60 is located at a different level of directory structure 44. A class at any level in directory structure may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and $60b$ form one branch of directory structure 44.

A buyer 20 may navigate through directory structure 44 by expanding or collapsing various classes as desired. For example, FIG. 2 illustrates an expansion of certain classes of directory structure 44 to reach a felt-tip pen class $60b$. Once a buyer 20 has navigated to a class that is specific enough for buyer 20 (and/or a class that is at the end of a branch), buyer 20 may then perform a search for products included in that class. For example, buyer 20 can search for all products in writing utensils class 56 that are blue felt-tip pins having medium tips. Alternatively, if buyer 20 navigates to the end of a branch of directory structure 44, such as felt-tip pen class $60b$, GCD 42 may then enable buyer 20 to search for such pens that have blue ink and medium tips (which may reach the same result as the search above).

However, as described above, product features (at least features that are more specific than the features defined by a class, as described below) are not typically stored in GCD 42, but are stored in databases 32. For example, a seller 30 may maintain a relational database 32 that includes a plurality of tables defining selected features of a variety of products. One or more pointers may be associated with each class to identify the location of one or more databases 32 that include product data for products contained in that class or to identify particular data products in databases 32. Therefore, GCD 42 may execute a search for products in databases 32 identified by a pointer corresponding to a user-selected class. GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP). LDAP enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP)

such that each class in directory structure 44 includes the attributes of parent classes in which the class is a sub-class. Therefore, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60*b*, a search performed by buyer 20 (or by GCD 42 on behalf of buyer 20) from felt-tip pens class 60*b* may automatically be limited to a search for felt-tip pens and buyer 20 may introduce additional desired search criteria (such as blue ink and medium tip). Therefore, if the database(s) 32 searched includes product data relating to a variety of writing utensils, a search of database 32 may be automatically limited by GCD 42 to only include felt-tip pens within that database 32. If a search including only the class attributes as the search criteria is not specific enough, buyer 20 may identify additional product features as additional search criteria.

When GCD 42 has performed a search of the databases 32 identified by a pointer associated with a class that buyer 20 has selected, GCD 42 returns product data associated with one or more products that fit the search criteria. GCD 42 may integrate the product data resulting from the search into directory structure 44 so that the product data appears to buyer 20 as being part of GCD 42. GCD 42 may alternatively present the results of the search in any other appropriate manner. Each product resulting from the search may be an object which is unique instance of the class in which buyer 20 is searching. Each such object (and its location) may be uniquely identified using a numbering scheme corresponding to directory structure 44, as described below. As can be seen from the description above, GCD 42 provides the advantages of a global database without many of the disadvantages associated which such a global database. These advantages are realized since GCD 42 provides access to and presentation of global product data without actually storing all such data.

Different seller databases 32 may include product data about the same class of product (for example felt-tip pens), however these different databases 32 may identify products of that class using different features, they may use different names for the same product feature, and/or they may quantify product features in different units of measurement. Some of these issues may be solved using translation mechanisms that convert the data into a uniform format used by GCD 42. In addition, sellers 30 may create databases 32 (or modify existing databases 32) to conform to a uniform standard in anticipation of a database 32 being used in association with global content directory 42. If a database 32 does not completely conform to such a uniform standard, the database 32 may be partially integrated into GCD 42, but some products in the database 32 may not be properly identified and presented to a buyer 20 using GCD 42. Therefore, through translation mechanisms and market pressure to be included and fully integrated into a global directory of products, a seller databases 32 may conform to the uniform standard used by GCD 42 to identify the particular class or classes of products included in the database 32.

Although exemplary directory 44 may use industry standard schemas 46 as described above, any other appropriate number of schemas 62 may be used in addition to or instead of industry standard schemas 46. For example, while industry standard schemas 46 may be organized from a manufacturer's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one set of schemas 62, these products may be organized into a variety of unrelated classes based on certain features of the products (for example, certain kitchen appliances may be categorized in an electronics class 52 of directory structure 44 while paint may be categorized into an industrial class 52). However, another exemplary set of schemas 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

In summary, a buyer 20 may search for a product using GCD 42 and thus eliminate or reduce the need for buyer 20 to search numerous sellers 30 to find the desired product. GCD 42 provides access to product data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product data relating to a product, and then communicate with an appropriate database 32. This access to vast numbers of products is provided without the requirement that all data about the products be stored in a global database (which would greatly decrease performance). Instead the product data may be stored in seller databases 32 that can be readily accessed from the global content directory.

Figure 3:
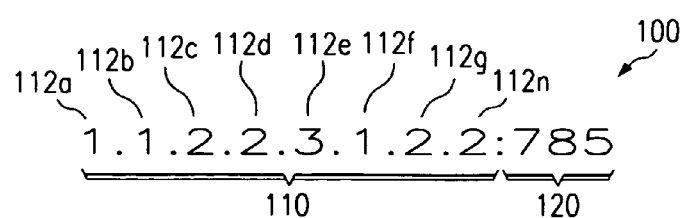
FIG. 3 illustrates an exemplary globally unique identifier that may be used to uniquely identify products that may be accessed from a global content directory.

FIG. 3 illustrates an exemplary globally unique identifier (GUID) 100 that may be used to uniquely identify products that may be accessed using GCD 42. Directory structure 44 of GCD 42 provides a powerful tool for organizing and categorizing products. This organizational structure may also be used to identify products and product features using a GUID 100 that identifies the various classes into which a product is categorized. Furthermore, as described below, source information (such as information about a supplier or manufacturer) may also be included in a GUID 100 to identify a specific manufacturer, supplier, and/or other entity from which the specific product may be obtained.

The exemplary GUID 100 illustrated in FIG. 3 includes a class identifier (CID) 110 and a product identifier (PID) 120. CID 110 and PID 120 may be combined in any appropriate manner to form GUID 100. Exemplary CID 110 identifies the classes of GCD 42 into which a product identified by GUID 100 is categorized. The numbers identifying such classes are concatenated in order from a highest level class number 112*a* to a lowest level class number 112*n*. For example, class number 112*a* may identify a particular instance of GCD 42 (if there is more than one copy of GCD 42 or if GCD 42 is divided for load balancing) or may identify a set of schemas, such as industry standard schemas 46. Class number 112*n* may identify a class at the end of a branch of directory structure 44, such as felt-tip pen class 60*b*, or any other class which is a sub-class of the class or category identified by class number 112*a*. The class numbers 112 between class numbers 112*a* and 112*n* may then identify in succession the classes in directory structure 44 between the highest level class (identified by class number 112*a*) and the lowest level class (identified by class number 112n). In this case, each successive class number 112 identifies a sub-class of the class identified by the previous class number 112 in CID 110.

As an example only, the exemplary classes illustrated in directory structure 44 of FIG. 2 have been labeled with class numbers 112 in parenthesis to the right of the class name. Using these class numbers 112, exemplary CID 110 illustrates one technique for identifying felt-tip pen class 60b. In this example, the first class number 112a identifies GCD 42, the second class number 112b identifies industry standard schemas 46, the third class number 112c identifies indirect materials class 50, the fourth class number 112d identifies office and computer supplies class 52, the fifth class number 112e identifies desk supplies class 54, the sixth class number 112f identifies writing utensils class 56, the seventh class number 112g identifies pens class 58, and the eighth class number 112n identifies felt-tip pen class 60b.

As is illustrated, the various class numbers 112 are concatenated so that each previous class number 112 gives meaning to subsequent class numbers 112. In this example, the sub-classes directly under each class of directory structure 44 are numbered starting at one (and ending at any appropriate number, indicated by "n"). Since multiple classes on the same level of directory structure 44 may have the same class number 112, such classes are uniquely identified by referring to the higher level classes in which the classes are included. For example, office and computer supplies class 52 is located on the same level as and has the same class number 112 as an electronics class 64; however, office and computer supplies class 52 may be uniquely identified by concatenating the class numbers 112 of industry standard schemas 46, indirect material class 50, and office and computer supplies class 52 to form a unique CID (in this case, "1.2.2"). This numbering scheme provides flexibility when adding and removing classes at any level. For example, another "pen type" class 60 may be added under pen class 58 and numbered without disrupting the numbering scheme of directory structure 44.

Although an exemplary numbering system has been introduced, the classes may be numbered using any appropriate technique. For example, each class above a particular level in directory structure 44 may have a unique class number 112 and each class below that particular level may be numbered as described above. Such a numbering system may be useful to reduce the length of a concatenated CID 110. For example, office and computer class 52 may have a unique number (as well as all classes at the same level or above), so that the "1.1.2.2" at the beginning of exemplary CID 110 may be replaced with this single number. Any other suitable numbering technique may also be used.

Exemplary GUID 100 also includes PID 120 which is used to uniquely identify a specific product that is included in the class identified by CID 110. Using the example above, PID 120 may identify a particular product in felt-tip pen class 60b. For example, PID 120 may identify a blue felt-tip pen having a medium tip and manufactured by a particular company. Therefore, since the classes of directory structure may not include all of the attributes of a particular product that may be needed to uniquely identify the product (for example, there are multiple types of felt-tip pens that may be included in felt-tip pen class 60b), PID 120 may be used to further identify a particular product in a class. Since each unique product in seller databases 32 may be an object of a class in GCD 42, PID 120 (combined with CID 110 to form GUID 100) can be used to uniquely identify any product included in databases 32.

A buyer 20 using GCD 42 may select a particular class of GCD 42, such as felt-tip pens class 60b, and request that a search be performed for all blue felt tip pens included in class 60b. In response to this search request, GCD 42 may initiate a search of one or more seller databases 32 (or one or more sets of product data in databases 32) identified by one or more pointers associated with class 60b. The results of this search of databases 32 may include product data for each of a number of blue felt-tip pens meeting the search criteria (the product data may include features of the product that were not searched for). Furthermore, a GUID 100 for each blue felt-tip pen may be associated and/or displayed with or be included in the product data. Buyer 20 may then choose one of the blue felt-tip pens identified in the search (for example, a medium point pen manufactured by XYZ Company having a price of fifty cents per pen).

In addition to CID 110 and PID 120, a GUID 100 may also include or be associated with a repository identifier (RID). An RID is a unique ID assigned to a seller 30 included in e-commerce system 10. An RID may also indicate a manufacturer of a product (if different than the seller 30) and any other entity involved in the manufacture, distribution, and sale of a product (one or more of which may be identified using a single RID). When buyer 20 selects a product listed in search results displayed by GCD 42, GCD 42 may identify one or more sellers 30 from which the product may be obtained using an RID. Each RID may identify the network location (such as a URL or other network address) of the seller database 32 that includes the product (or an associated web site through which the product is available), so that buyer 20 may access the database 32 and/or web site to purchase the product or conduct some other transaction regarding to the product. An RID may be associated with a URL or an Internet Protocol (IP) address of a computer coupled to the Internet (or another network) that supports the database 32 and/or web site. An RID may be returned to a buyer 20 in response to the entering or selection of a CID 110 and PID 120. An RID may also be included, along with a CID 110 and PID 120, on a label or other part of a product so that a buyer 20 may determine how to obtain additional products of that type.

An RID may use any appropriate format to uniquely identify sellers 30. For example, sellers 30 may be numbered in order as sellers 30 are included in system 10. A numbering scheme may alternatively be used in which the number or combination of numbers assigned to a seller 30 identifies a characteristic or characteristics of the seller 30. For example, sellers 30 in a particular country may be assigned a number from a predefined range of numbers. Alternatively, a prefix may be included in a RID to identify the location of a seller 30 (much like an area code in a telephone number). Any other appropriate characteristic(s) of a seller 30 may also be identified using RID and any suitable numbering format may be used.

GUID 100 may also include or be associated with a feature identifier (FID). As described above, a CID 110 and a PID 120 may be used to uniquely identify a product having a unique set of features. Some of these features are defined by the attributes of the classes of GCD 42 in which the product is included, but other features are defined in a database 32 and may be identified as a unique grouping of features by a PID 120 (however, two products in a database 32 may have identical features listed in database 32 but different PIDs, since the difference between the products may be associated with features not included in database 32 or may be simply a difference in the PID assigned by the manufacturer for the same product). One or more of the group of features identified by a PID may be individually identified using an FID. For example, if a buyer 20 wants to identify the color of ink in a particular pen (the pen identified using a CID 110 and PID 120), then the buyer 20 may do so by including the FID associated with ink color with the CID 110 and PID 120 in a search. The search results may then include the color of the ink that is used in the identified product. Alternatively, an FID may be used to specify a particular feature (such a blue ink) as a search criteria when searching for a product (such as felt-tip pens).

Figure 4:
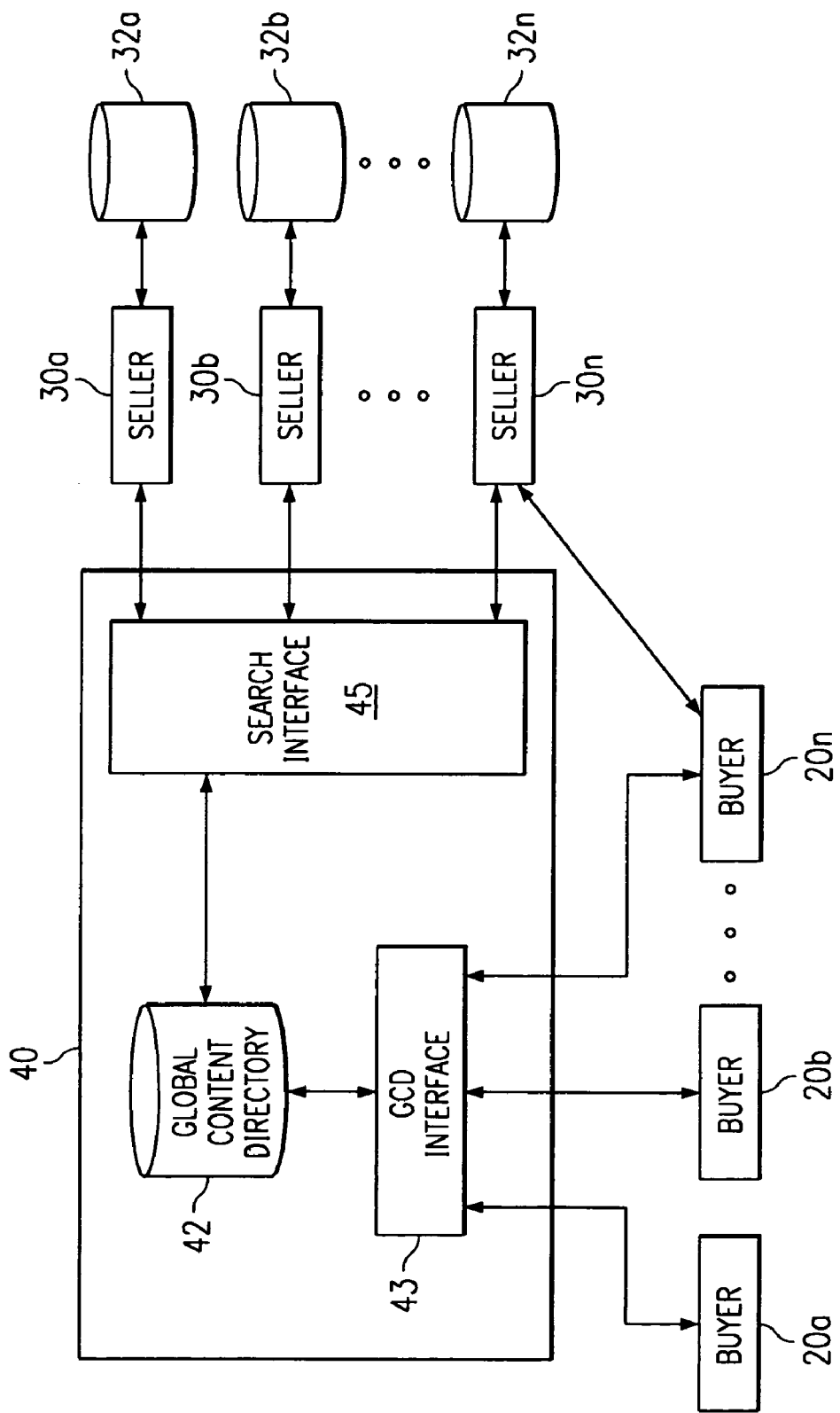
FIG. 4 illustrates exemplary operation of an electronic commerce system.

FIG. 4 illustrates exemplary operation of e-commerce system 10. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using web server software and/or hardware or in any other appropriate manner. Server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified.

In an exemplary transaction, a buyer 20 may access a GCD interface 43 and perform a search of global content directory 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class having certain features. For example, if buyer 20 is browsing felt-tip pens class 60b, buyer 20 may request all products in class 60b (felt-tip pens) that have red ink and a fine tip.

A search interface 45, or any other appropriate component of GCD server 40, may facilitate such a request by searching or requesting searches of seller databases 32 identified by one or more pointers associated with felt-tip pens class 60b, as described above. Search interface 45 may provide buyer 20 with a search form in which to enter one or more search criteria. The types of search criteria that ay be used may be identified in the search form or buyer may be allowed to perform a general search of databases 32 for certain terms. For example, search interface 45 may provide buyer 20 with a search form tailored for class 60b that includes fields where buyer 20 can specify a desired ink color, tip thickness, or any other appropriate criteria. Alternatively, search interface 45 may provide a single field where buyer can enter in desired search terms, such as "red" and "fine" (multiple search terms may be entered using Boolean operators or any other appropriate technique).

Based on the search terms provided by buyer (and possibly based on any appropriate attributes of the class from which the search is conducted), search interface 45 may communicate a query to the appropriate seller database(s) 32 requesting that databases 32 each return a listing of all products (including associated product data) that meet the search criteria. Databases 32 may also communicate product data relating to features of the matching products that were not included in the search criteria. For example, databases 32 may return a price and availability of a product that meets the search criteria even if the price and availability were not search criteria The responses to the queries of databases 32 may be displayed to buyer 20 in any appropriate manner. For example, the products may be listed in order of relevance to the search criteria according to improved matching criteria as described in copending U.S. application Ser. No. 09/742,851 filed Dec. 20, 2000 . Any other appropriate method of determining relevance may alternatively be used. Furthermore, GCD 42 may reorder the product listing based on a request from buyer 20. For example, buyer 20 may request that the matching products be listed in order from least expensive to most expensive. Each product in listing may be associated with a GUID 100 and/or an RID.

Buyer 20 may select a product from the product listing to indicate a desire to initiate a transaction regarding the product, such as a purchase of the product. Upon such a selection, GCD 42 may communicate an RID of the supplier of the product and a GUID 100 for the product to buyer 20. For example, RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID 100. GCD 42 may even provide a link including a URL of a web site associated with the seller 30 or may provide other appropriate method for buyer 20 to be connected to seller 20. Although only a single exemplary arrow (between buyer 20n and seller 30n) is shown to illustrate communication between buyers 20 and sellers 30, it should be understood that any buyer 20 may communicate with any seller 30 to conduct appropriate transactions.

Since GCD 42 is able to communicate with databases 32 to identify certain products requested by a buyer 20, information about the products categorized in GCD 42 does not have to be stored at GCD 42. Furthermore, since buyer 20 may communicate directly with an appropriate seller 30 after selecting a product identified by GCD 42 and being given location information for a seller 30 of the product, GCD 42 does not have to maintain resources to support transactions relating to the product. Therefore, by linking a directory of products to databases 32 containing information about the products, potentially every product in the world may be made available to a buyer 20 without having to store information about all such products (which would be infeasible due to the immense amount of data that would have to be stored, the difficulties associated with keeping the data up to date, and other problems).

In addition to providing a method of identifying products located using GCD 42, a GUID 100 may also be used in the physical world to identify products. Similarly, an RID may be used to identify the source of a particular product. Therefore, a GUID 100 may be used to replace a universal product code (UPC) that currently is used to identify a product. Unlike a UPC, however, a GUID 100 provides a much more flexible numbering scheme (for example, it may be expanded to accommodate the addition of an unlimited number of classes at any level in directory structure 44) and provides a definition of certain attributes of a product through its connection to the object-oriented class hierarchy of GCD 42. An RID may also be associated with (or be included in GUID 100) to provide the identity of the source of the product. Therefore, if a buyer 20 desires to purchase a product having a GUID 100 and RID, the GUID 100 and RID may be scanned or entered into a computer coupled to e-commerce system 10 (or coupled to sellers 30) to initiate a purchase of the product. For example, if a buyer 20 runs out of milk, buyer 20 may scan or enter in the GUID 100 and RID located on the empty milk jug and also enter in a unique identifier of the buyer 20. Based on the RID, the product request may be directed to the appropriate seller 30 and the seller may use a buyer identifier to charge buyer 20 for another milk jug and to ship the milk jug to the buyer 20. Any appropriate systems may be implemented to perform the functions necessary to complete such a transaction. A buyer 20 may also communicate a GUID 100 to GCD 42 to determine the RID of and/or other information about one or more sellers 30 that supply the product with the GUID 100. A GUID 100 and/or an RID also may be used in numerous other ways to streamline business transactions.

As described above, one advantage of GCD 42 is that it provides access to vast numbers of products but does not have to store much information about these products (since the information in stored in seller databases 32). Furthermore, GCD 42 may direct buyer 20 to sellers 30 to conduct a transaction regarding a product, so GCD 42 does not have to support e-commerce transactions between buyer 20 and sellers 30. However, since buyers 20 may typically communicate with sellers 30 to complete a transaction, the performance of e-commerce system 10 may be decreased if a buyer 20 and seller 30 involved in a transaction are located at a large distance from one another (since the communication time is increased). Furthermore, performance may be decreased if a particular seller 30 experiences a large volume of transactions and is unable to support such a volume. Therefore, certain embodiments of the present invention contemplate the dynamic migration of product data relating to a particular product(s) from seller databases 32 to network nodes that are closer to frequent buyers 20 of the product(s). Buyers 20 may then access the migrated product data to conduct transactions with sellers 30 associated with the migrated product data (or buyers 20 may directly access the seller database or databases 32 from which the product data is copied). As described above, "product data" may include data describing various features of a product as well as any software that may be used to support a purchase of the product or any other transaction relating to the product.

As described above, buyers 20 are directed by GCD 42 to access product data that is stored in seller databases 32. A database 32 may be controlled by an associated seller 30 and is often associated with a seller web site that provides buyers 20 with the ability to conduct transaction with seller 30. As numerous buyers 20 access GCD 42 and are directed to seller databases 32 to conduct product transactions, GCD 42 may establish a record of the databases 32 that are typically accessed by each buyer 20. For example, an office supply retailer may frequently request products, such as pens, that are included in office and computer supplies class 52. Using the results of such product requests returned by GCD 42 (such as the RIDs of particular sellers 30), the office supply retailer may access one or more seller databases 32 that include product data for various office supplies. Such seller databases 32 may include a variety of office supplies or may specialize in one or more types of office supplies, such as writing utensils.

In response to a number of requests by a buyer 20 that result in buyer 20 accessing a particular seller database 32 (a "request history"), GCD 42 may determine that some or all of the product data in the database 32 should be migrated to a network node in e-commerce system 10 that is closer to buyer 20 than the actual database 32 based on a determination or prediction from the request history that the buyer 20 will request the product data again. The node to which such product data is migrated is preferably located closer to buyer 20 than the seller database 32 so that the access time required to obtain product data or otherwise conduct a transaction is reduced. Furthermore, the migration of product data may be dependent upon the request history of multiple buyers 20, such as a number of different office supply retailers. In such a case, the relevant product data may be migrated to a network node that is located closer to each of the buyers 20 than the actual seller database 32 from which the product data originates. Alternatively, the same product data may be migrated to multiple locations, in whole or in part, to provide efficient access by multiple buyers 20. Any appropriate algorithm may be used to determine the appropriate caching or other storage locations.

The number of locations to which a particular set of product data is migrated may be determined by balancing the advantages of locating the product data close to each associated buyer 20 and the disadvantages of having multiple caches or other stores (such as the need for data storage space at multiple caching nodes and the need for synchronization of product data at the source database 32 and the multiple caches). Moreover, when multiple buyers 20 influence the migration decision, the relative data access requirements of each buyer 20 may be weighted so as to locate the cached product data closest to the buyer or buyers 20 that most frequently need to access the data. For example, although a number of small retail chains may frequently access product data relating to office supplies, the product data may be migrated closer to the location of a large retail chain (although the storage location or locations may still be closer to each of the retail chains than the actual seller database 32).

GCD 42 may use any appropriate technique for predicting future requests of buyers 20 for product data based on the request history of buyers 20. Any other suitable information about buyers 20 may also be used to predict future requests by buyers 20 and such predictions may be updated as GCD 42 obtains additional information. GCD 42 may use any appropriate caching or other data storage technique to direct the migration of product data to one or more network nodes. These network nodes may include a network device associated with any buyer 20 or seller 30, a network device used solely for the purpose of caching or otherwise storing migrated data, or any other device coupled to a network accessible by a buyer 20 wanting to access the migrated data. For example, a selected amount of data storage space associated with numerous buyers 20 and sellers 30 may be allocated for GCD 42 to use as needed for caching space (possibly as a requirement to register with GCD 42). Therefore, as an example, product data associated with seller 30a and requested by buyer 30a may be cached at seller 30b or at buyer 30b. As another example, product data that is frequently accessed by buyer 20a may be cached at buyer 20a (and such cached product data may be located inside a firewall of buyer 20a).

GCD 42 may manage all of the available caching space so as to optimize the caching of numerous sets of product data for numerous buyers 20 using a particular set of product data. GCD 42 may migrate a particular set of product data to different locations as the buyers 20 using that product data change or as that particular location becomes needed for migration of other product data. If a particular set of product data has not been requested for a selected period of time, that product data may be overwritten by different product data to be cached instead of being migrated to a different caching location (such as in a least recently used caching algorithm).

GCD 42 may determine whether all or a portion of the product data in a seller database 32 should be migrated and cached or otherwise stored near a buyer 20. For example, if a database 32 includes product data for a variety of office supplies, GCD 42 may only cache the product data relating to pens if the relevant buyers 20 are only requesting information about pens. Other product data in the database 32 may be migrated elsewhere for different buyers. Furthermore, product data from several different databases 32 may be cached together (although the seller 30 associated with a particular product may still be individually identified). For example, product data relating to a variety of pens sold by a variety of sellers 30 may be migrated to the same location. Data from different databases 32 that is cached together may be merged into a single database (or database table) or may stored as separate databases (or tables) at the caching location.

The migration of product data improves the efficiency of transactions between buyers 20 and sellers 30 in e-commerce system by reducing the access time and transaction costs associated with a buyer 20 accessing product data of a seller 30 used to conduct the transaction. However, since the product data accessed by the buyer 20 is only a migrated copy of the product data stored at the associated seller database 32, the migrated data should be updated when the product data is updated at the seller database 32 (the migrated product data should be "synchronized" with the product data stored in seller database 32). Although the synchronization of product data may require resources in e-commerce system, the frequency with which product data changes in a seller database 32 is typically less than the frequency with which the product data is accessed by buyers 20. Therefore, it is often more efficient to migrate and cache or otherwise store product data closer to a buyer 20 (and thus farther from the associated seller 30) even if this creates the need from updated data to be communicated to the remote caching locations.

Migrated data may be synchronized using any appropriate technique. As an example, a pointer may exist between a seller database 32 and a migrated copy of product data from the database 32. When product data is updated at database 32, database 32 (or any other appropriate component associated with seller 30) then determines whether there are any pointers associated with the product data that was updated. If so, the updated product data may be communicated to the migration location and the migrated product data can be replaced with or modified using the updated product data.

In addition to directing the migration of product data at a remote migration location, GCD 42 may also cache the results of frequent queries made by buyers 20 using GCD 42. Such results may include lists of products resulting from a buyer's search for products in a particular class. As described above, GCD 42 may generate these product lists (which may include a GUID 100 and an RID associated with each product) based on queries of the databases 32 identified by pointers associated with a particular class in GCD 42. Therefore, if GCD 42 caches frequently performed queries, then GCD 42 may not have to perform such queries each time a buyer 20 makes a search request. Instead, GCD 42 may display the cached search results. Any appropriate caching technique may be used to store search results or the results of other queries performed by GCD 42. Furthermore, the cached search results may be updated using any appropriate techniques. For example, GCD 42 may perform a new query instead of using cached results once a selected amount of time has passed since the results were updated. Alternatively, a seller database 32 may inform GCD 42 when data communicated from database 32 in response to a GCD 42 query has been modified.

As described above, migration of product data for caching or other storage at locations nearer to the buyers 20 that frequently access the product data is one way to optimize the performance of e-commerce system 10. Another way that the performance of system 10 may be enhanced is to optimize the indexing of the data stored in seller databases 32. An index of a database 32, like an index of a book, provides a quicker method of locating requested information in a database 32. Therefore, an index decreases the time it takes to perform a "read" of a database 32. Data also often needs to be added, deleted, and modified in a database 32 (which may be referred to as a "write" to a database 32). However, when data is written to a database 32, any index of that data also has to be updated or modified. Therefore, the efficiency and speed of data writes to a database 32 is decreased if the data is indexed. Therefore, to optimize the performance of a database 32, the decision of whether to index particular categories of data in a database 32 may be based on the number of reads and writes associated with that data.

FIG. 5 illustrates an exemplary table 150 that may be included in a seller database 32. Database 32 may include one or more tables 150 and each table 150 may contain product data relating to one or more types of products. For example, exemplary table 150 includes product data relating to different types of pens. However, table 150 could also include product data for other types of products (for example, other types of office supplies) or this product data may be contained in other tables 150 in database 32. Table 150 includes a plurality of columns 152 that each include data relating to a particular product feature. Although an exemplary number of columns 152 including exemplary product features are illustrated, it should be understood that any appropriate number and type of product features or other categories of data may be included in table 150. Table 150 also includes a number of rows 154 that may each correspond to a particular product (and an associated PID) and that each include data values for one or more of the product features. Each of the data values (which may be numeric, textual, or in any other appropriate format) is located at the intersection of the row 154 associated with a particular product and the column 152 that includes a particular product feature. Each of these intersections may be referred to as a field or cell 156 of table 150.

As described above, the data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32, the associated database management system (or other appropriate interface to database 32) does not have to search through every field 156 in the tables 150 included in database 32 to locate the requested data. Instead, the data may be indexed such that when GCD 42 or a buyer 20 submits a query for products having certain values of features that have been indexed, the database management system already knows the locations of such products in table 150 and may return product data associated with these products without searching the entire table 150 or database 32 for the products. For example, if the ink color fields 156 and tip size fields 156 of columns 152d and 152e, respectively, are indexed, then the index will typically identify the location of all products having black ink and a medium tip size.

If GCD 42 or a buyer 20 submits a query that also specifies a certain value or values of non-indexed features (for example, a query for pens manufactured by ABC Company, if the manufacturer fields 156 in column 152c are not indexed), then the associated database management system may perform a search of database 32 for products that include the specified value or values of the non-indexed features. However, such a search may be limited to the products already identified (using the index) as including specified values of indexed features (for example, pens having black ink and a medium tip). that are also included in the search. Therefore, the amount of time required to perform the search may be reduced even though one or more of the features that are searched for are not indexed.

As described above, although the indexing of fields 156 provides the advantage of speeding up reads of databases 32, such indexing slows the process of writing to databases 32 (since the indices, as well as tables 150, must be updated when the data in indexed fields 156 is changed). Therefore, the number of writes performed should be taken into consideration when determining whether to index the fields 156 associated with a particular feature (the fields 156 in a particular column 152). Since the frequency at which the data in table 150 is rewritten varies depending on the feature with which the data is associated (the column 152 in which the data is located), the determination of whether to index may be made on a feature-by-feature basis. Such a determination may take into account the number of times data associated with a particular feature is read and written during a selected period of time and mat also take the computational cost of indexing into account.

More specifically, the following equation may be used to determine whether to index a feature:

$$\Delta t = n_r t_r - n_w t_w$$

In this equation, $n_r$ is the number of reads of fields 156 associated with a particular feature that are performed during a selected period of time, $t_r$ is the time required for each read, $n_w$ is the number of writes to fields 156 associated with the feature that are performed during the selected period of time, and $t_w$ is the time required for each write. Therefore, $\Delta t$ is the difference between the total time required for reads during the selected period and the total time required for writes during the period. The above equation assumes that it takes the same amount of time for each read and the same amount of time for each write. However, if different amounts of time are required for each read (or for each write), then the time for each read (or each write) during the selected period can be summed. Alternatively, an average or median read time ($t_r$) or write time ($t_w$) may be used and multiplied by the number of reads ($n_r$) or number of writes ($n_w$), respectively. Furthermore, the read and write times used may be measured or may be specified based on knowledge of previous or expected read and write times.

Using the above formula, the value of $\Delta t$ is calculated for a particular feature assuming that the associated fields 156 are indexed and the value of $\Delta t$ is also calculated assuming that the fields 156 are not indexed. The decision as to whether to index the feature is then made based on which $\Delta t$ is smaller. The absolute value of $\Delta t$ may be taken to eliminate any negative numbers or $\Delta t$ may be squared for the same purpose. Using this exemplary method, if $\Delta t$ with indexing is less than $\Delta t$ without indexing, then the fields 156 associated with the feature are indexed. If $\Delta t$ with indexing is more than $\Delta t$ without indexing, then the fields 156 associated with the feature are not indexed. Therefore, the decision to index or not may be based on which option most closely balances the total time required for reads and writes during a selected period of time. Such a determination thus assumes that reads and writes are equally important (although, as described below, this may not be the case).

An example of an indexing decision using the above equation is as follows. During a day (the selected time period), one thousand reads are performed and one hundred writes are performed for product data associated with a particular feature. If the fields 156 associated with the feature are indexed, each read takes one second and each writes takes four seconds. If the fields 156 associated with the feature are not indexed, each read takes two seconds and each write takes two seconds. Therefore, indexing halves the read time, but doubles the write time. Using the above equation, $\Delta t$ with indexing is equal to (1000)(1)−(100)(4) or six hundred seconds and $\Delta t$ without indexing is equal to (1000)(2)−(100)(2) or eighteen hundred seconds. Therefore, using the exemplary decision criteria described above, the decision would be made to index the feature.

Although the above equation and example determines the difference in total read time and total write time during the selected period, an alternative calculation could be used that adds the total read time and the total write time to determine the total time required for reads and writes ($n_r t_r + n_w t_w$). This total time could be calculated for a particular feature with that feature being indexed and not indexed. If indexing produces a lower total read and write time than not indexing, then the feature may be indexed. If not, then the feature may not be indexed. Using the numbers in the example above, the total read and write time with indexing is fourteen hundred seconds and the total read and write time without indexing is twenty-two hundred seconds. Therefore, indexing the feature produces the minimum total read and write time and the feature may be indexed based on this determination.

The calculations described above (either adding or subtracting the read and write times) may be repeated for each feature (each column 152) included in tables 150 of a database 32. Based on the calculations, a determination may be made for each feature as to whether the fields 156 associated with that feature should be indexed. If there is no limit on the number of features that may be indexed, then all features for which indexing is determined to be appropriate may be indexed. If not all features can be indexed, then those features having the lowest $\Delta t$ or the lowest total read and write time may be indexed. For example, there may be a threshold above which a feature is not indexed even if indexing produces a lower $\Delta t$ than not indexing. For instance, if $\Delta t$ with indexing is only slightly smaller than $\Delta t$ without indexing, then the feature may not be indexed since the computational and other costs associated with indexing would overshadow this small difference.

As described above, any appropriate period of time may be selected during which to determine the number of reads and the number of writes for the above calculations. However, it may be advantageous to choose a period that is long enough to discount any temporary fluctuations in reads or writes. For example, if the selected period is once a minute and an abnormally large amount of writes occur during that minute, then the indexing decision may be skewed. Furthermore, if such fluctuations have a large impact on the indexing decision, then features may indexed and "un-indexed" at a rate that is inefficient. Therefore, the selected period may preferably be a period that balances the advantages of frequent indexing (such as making the indexing decision flexible to changing conditions) and the disadvantages of frequent indexing and un-indexing (such as those described above). In addition, the database management system associated with a database 32 may track past indexing decisions to optimize the time period that is used.

Although the calculations described above equally weight the total read time and total write time during the selected period, unequal weighting of these times may be appropriate in certain circumstances. For example, a seller 30 may want to reduce the time that it takes for a buyer 20 or GCD 42 to access an associated database 32 at the expense of the write time required for the seller 30 to update data in database 32. Since seller 30 may perform such updates as a batch job during off-peak access hours, seller 30 may not be as concerned about the write time. In such a case, or in any other case where reads are determined to be more important that writes (or vice versa), the more important factor may be emphasized in the equation above by adding a weighting factor. For example, the equation above may be rewritten as follows:

$$\Delta t = w_r n_r t_r - w_w n_w t_w$$

In this equation $w_r$ is the weighting factor given to the reads and $w_w$ is the weighting factor given to writes.

In an exemplary embodiment, each weighting factor is less than or equal to one and the sum of the weighting factors is equal to one. For example, if writes are determined to be nine times as important as reads and the numbers are used from the example above, then $\Delta t$ with indexing is equal to |(0.1)(1000)(1)−(0.9)(100)(4)| or two hundred sixty seconds and $\Delta t$ without indexing is equal to |(0.1)(1000)(2)−(0.9)(100)(2)| or twenty seconds. Therefore, the decision would be made not to index the feature (unlike the decision made when the read and write times were equally weighted, as described above). A similar result is obtained if the total read and write time ($w_r n_r t_r + w_w n_w t_w$) is determined both with and without indexing and the minimum total read and write time is chosen.

Figure 6:
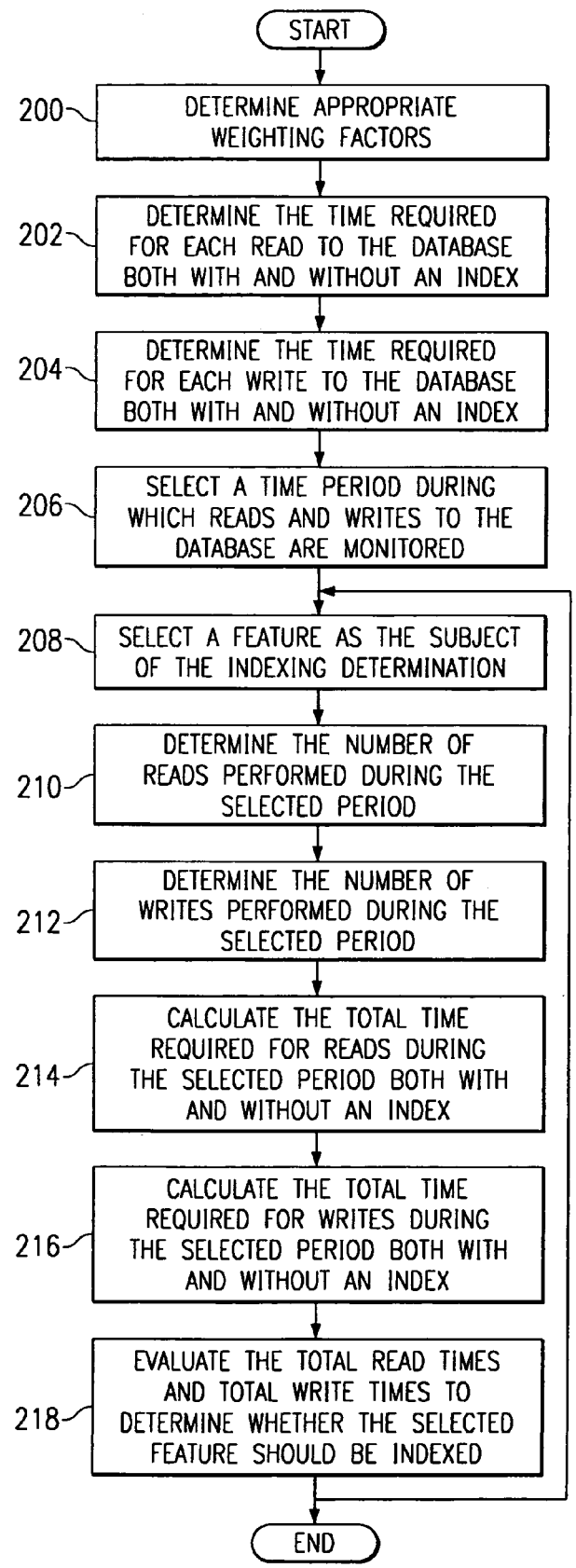
FIG. 6 illustrates an exemplary method for determining whether to index the fields of a table in a seller database.

FIG. 6 illustrates an exemplary method for determining whether to index the fields of a table 150 in a database 32. It should be understood, however, that the exemplary method and the various calculations described above apply to the indexing of any appropriate database, not just a seller database 32 in e-commerce system 10. The exemplary method begins at step 200 at which weighting factors $w_r$ and $w_w$ are determined, if appropriate. At step 202, $t_r$ is determined for reads both with an index and without an index. At step 204, $t_w$ is determined for writes both with an index and without an index. The time period during which reads and writes are to be monitored is selected at step 206. It should be noted that all of these determinations are made independent of the selection of a particular feature to possibly be indexed. Therefore, the exemplary method assumes that $t_r$ and $t_w$ are the same for every feature and that they can be determined before the reads and writes are monitored during the selected time period. For example, $t_r$ and $t_w$ may be based on past observations or other historical data. However, as described above, the time required for each read and write during the selected time period and/or for a particular feature may also be determined. In such a case, steps 202 and 204 may be performed during the selected time period and/or for the particular feature.

At step 208 of the exemplary method, a feature is selected as the subject of the indexing determination (whether the fields associated with the feature should be indexed). This determination may be made for the various features of a table 150 in any appropriate order or substantially simultaneously (although each determination may still be independent). At step 210, the number of reads that are performed during the selected time period on fields associated with the selected feature are monitored to determine the total number of reads performed. At step 212, the same determination is made regarding the number of writes performed. Steps 210 and 212 may be performed substantially simultaneously. The total time required for reads ($n_r t_r$) is determined for both the indexed and non-indexed cases at step 214 and the total time required for writes ($n_w t_w$) is determined for both the indexed and non-indexed cases at step 216. If appropriate, the various total times may also be weighted using suitable weighting factors. As with steps 210 and 212, steps 214 and 216 may be performed substantially simultaneously.

At step 218, the total read times and total write times with and without indexing are evaluated to determine whether the fields associated with the selected feature should be indexed. This evaluation may be performed using the calculations described above or using any other appropriate method. Once an indexing determination has been made for a particular feature, the method may return to step 208, as indicated by arrow 220, so that an indexing determination may be made for another feature (or such determinations may be made in parallel). When an indexing determination has been made for a particular feature, the indexing determination may be repeated for that feature at any appropriate intervals. For example, once the selected time period has expired and an indexing determination has been made, the method may be repeated and another time period may begin. It should be understood that although a particular series of steps is described, the steps may be performed in any appropriate order and steps may be added or removed if appropriate.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method for facilitating a commercial transaction involving a product, the method performed using one or more computer systems each comprising one or more processing units and one or more memory units, the method comprising:

using the one or more computer systems, communicating a globally unique identifier (GUID) for a particular product to a seller of the particular product, the GUID comprising:

a class identifier (CID) that uniquely identifies at least one product class in which the product is categorized, along with a plurality of other products, within a class hierarchy of a global content directory server for a distributed plurality of seller databases, each seller database being associated with a corresponding seller and distinct from the other seller databases in the distributed plurality of seller databases, the product class defining one or more attributes of the products categorized in the class; and a product identifier (PID) that uniquely identifies the particular product from among the plurality of products categorized in the product class uniquely identified by the CID; and using the one or more computer systems, specifying to the seller a desired commercial transaction involving the particular product uniquely identified by the GUID to facilitate the desired commercial transaction involving the particular product uniquely identified by the GUID.

2. The method of claim 1, wherein the CID comprises a class number of a first product class concatenated with class numbers of one or more product classes of the first product class which are at higher levels in the class hierarchy than the first product class.

3. The method of claim 2, wherein the CID comprises numbers of every parent product class of the first product class.

4. The method of claim 1, wherein the seller of a particular product is uniquely identified according to a repository identifier (RID) associated with the GUID uniquely identifying the particular product.

5. The method of claim 4, wherein the RID comprises an electronic address associated with the seller.

6. The method of claim 4, wherein the RID identifies an electronic address of the seller stored at the global content directory server.

7. The method of claim 1, further comprising communicating to the seller a buyer identifier for a buyer specifying the desired commercial transaction.

8. The method of claim 7, wherein the buyer identifier is associated with logistical information for the buyer enabling the desired commercial transaction to be conducted without further action by the buyer.

9. The method of claim 8, wherein the buyer identifier is associated with the logistical information at the seller to enable the desire commercial transaction.

10. The method of claim 8, wherein the buyer identifier is associated with the logistical information at the global content directory server to enable the desired commercial transaction.

11. The method of claim 8, where the logistical information comprises information selected from the group consisting of payment information and shipping information.

12. A computer-implemented method for facilitating a commercial transaction involving a product, the method performed using one or more computer systems each comprising one or more processing units and one or more memory units, the method comprising:
   using the one or more computer systems, communicating to a globally unique identifier (GUID) for a particular product to a seller of the particular product, the GUID comprising:
      a class identifier (CID) that uniquely identifies at least one product class in which the product is categorized, along with a plurality of other products, within a class hierarchy of a global content directory server for a distributed plurality of seller databases, each seller database being associated with a corresponding seller and distinct from the other seller databases in the distributed plurality of seller databases, the product class defining one or more attributes of the products categorized in the class, the CID comprising a class number of a first product class concatenated with class numbers of a plurality of parent product classes of the first product class which are at higher levels in the class hierarchy than the first product class; and
      a product identifier (PID) that uniquely identifies the particular product from among the plurality of products categorized in the product class uniquely identified by the CID;
   using the one or more computer systems, specifying to the seller a desired commercial transaction involving the particular product uniquely identified by the GUID, to facilitate the desired commercial transaction involving the particular product uniquely identified by the GUID; and
   using the one or more computer systems, uniquely identifying the seller of the particular product according to a repository identifier (RID) associated with the GUID to further facilitate the desired commercial transaction involving he particular product uniquely identified by the GUID.

13. The method of claim 12, wherein the RID comprises an electronic address associated with the seller.

14. A global content directory server, comprising:
   a storage medium stored therein a directory structure comprising a plurality of product classes organized in a hierarchy, each product class categorizing a plurality of products and defining one or more attributes of the products categorized in the product class, each product class uniquely identified by a class identifier (CID), wherein one or more pointers are associated with each product class in the plurality of product classes, each pointer identifying a seller database in a distributed plurality of seller databases in which product data enabling a product transaction is stored for products associated with the product class, the seller database identified by the pointer being associated with its corresponding seller and being distinct from the other seller databases in the distributed plurality of seller databases; and
   a server search interface to communicate, in response to a selection of a product class by a user of the global content directory server, a search query for product data to the one or more seller databases identified by the one or more pointers associated with the selected product class, each seller database being associated with its corresponding seller and distinct from the other seller databases in the plurality of seller databases;
   wherein the server search interface receives, in response to the search query, search results comprising one or more product identifiers (PIDs) that each uniquely identify a particular product in the selected product class, the CID for the selected product class and the PID for a particular product collectively providing a globally unique identifier (GUID) for the particular product and communicates the search results to the user.

15. The directory of claim 14, wherein the CID comprises a class number of a first product class concatenated with class numbers of one or more parent product classes of the first product class which are at higher levels in the class hierarchy than the first product class.

16. The directory of claim 15, wherein the CID comprises the class numbers of every parent product class of the first product class.

17. The directory of claim 14, wherein the search results further comprise a repository identifier (RID) for each particular product, the RID uniquely identifying a particular seller of the product uniquely identified by the GUID.

18. The directory of claim 17, wherein the RID identifies the seller database in the distributed plurality of seller databases that includes product data associated with the product uniquely identified using the GUID.

19. The directory of claim 17, wherein the RID comprises an electronic address associated with the seller.

20. The directory of claim 17, wherein the RID identifies an electronic address of the seller stored at the global content directory server.

21. A global content directory server, comprising:
   a storage medium stored therein a globally unique identifier (GUID), the GUID comprising:
      a class identifier (CID) that uniquely identifies at least one product class in which the product is categorized, along with a plurality of other products, within a class hierarchy of a global content directory server, the product class defining one or more attributes of the products categorized in the class, the at least one product class being one of a plurality of product classes organized in the class hierarchy, each of the plurality of product classes categorizing a plurality of products and defining one or more attributes of the products categorized in the product class, one or more pointers being associated with each product class in the plurality of product classes, each pointer identifying a seller database in a distributed plurality of seller databases in which product data enabling a commercial transaction is stored for products associated with the product class, the seller database identified by the pointer being associated with its corresponding seller and being distinct from the other seller databases in the distributed plurality of seller databases; and a product identifier (PID) that uniquely identifies the particular product from among the plurality of products categorized in the product class uniquely identified by the CID; and a processor facilitating a commercial transaction involving the product uniquely identified by the GUID, wherein the CID and PID collectively provide the GUID.

22. The server of claim 21, wherein the CID comprises a class number of a first product class concatenated with class numbers of one or more parent product classes of the first product class which are at higher levels in the class hierarchy than the first product class.

23. The server of claim 22, wherein the CID comprises the class numbers of every parent product class of the first product class.

24. The server of claim 21, wherein a repository identifier (RID) uniquely identifies a particular seller of the product uniquely identified by the GUID.

25. The server of claim 24, wherein the RID identifies the seller database in the distributed plurality of seller databases that includes product data associated with the product uniquely identified by the GUID.

26. The server of claim 24, wherein the RID comprises an electronic address associated with the seller.

27. The server of claim 24, wherein the RID identifies an electronic address of the seller stored at the global content directory server.

28. The server of claim 21, wherein a feature identifier (FID) uniquely identifies a particular feature of the product uniquely identified by the GUID.

29. A global content directory server, comprising:
  a storage medium stored therein a directory structure comprising a plurality of product classes organized in a hierarchy, each product class categorizing a plurality of products and defining one or more attributes of the products categorized in the product class, each product class uniquely identified by a class identifier (CID) comprising a class number of a first product class concatenated with class numbers of a plurality of parent product classes of the first product class which are at higher levels in the class hierarchy than the first product class, wherein one or more pointers are associated with each product class in the plurality of product classes, each pointer identifying the seller database in the distributed plurality of seller databases in which product data enabling a product transaction is stored for products associated with the product class, the seller database identified by the pointer being associated with its corresponding seller and being distinct from the other seller databases in the distributed plurality of seller databases; and
  a server search interface to communicate, in response to a selection of a product class by a user of the global content directory server, a search query for product data to the one or more seller databases identified by the one or more pointers associated with the selected product class, each seller database being associated with its corresponding seller and distinct from the other seller databases in the plurality of seller databases;
  wherein the server search interface receives, in response to the search query, search results comprising one or more product identifiers (PIDS) that each uniquely identify a particular product in the selected product class, the CID for the selected product class and the PID for a particular product collectively providing a globally unique identifier (GUID) for the particular product and communicates the search results to the user.

30. The server of claim 29, wherein the server search interface further receives in response to the search query, a repository identifier (RID) for the particular product, the RID uniquely identifying a seller of the particular product uniquely identified by the GUID according to an electronic address of the seller.

31. A global content directory server, comprising:
  a storage medium stored therein a globally unique identifier (GUID), the GUID comprising:
    a class identifier (CID) that uniquely identifies at least one product class in which the product is categorized, along with a plurality of other products, within a class hierarchy of a global content directory server, product class defining one or more attributes of the products categorized in the class, the CID comprising a class number of a first product class concatenated with class numbers of a plurality of parent product classes of the first product class which are at higher levels in the class hierarchy than the first product class, the at least one product class being one of a plurality of product classes organized in the class hierarchy, each of the plurality of products classes categorizing a plurality of product and defining one or more attributes of the products categorized in the product class, one or more pointers being associated with each product class in the plurality of product classes, each pointer identifying a seller database in a distributed plurality of seller databases in which product data enabling a commercial transaction is stored for products associated with the product class, the seller database identified by the pointer being associated with its corresponding seller and being distinct from the other seller databases in the distributed plurality of seller databases; and
    a product identifier (PID) that uniquely identifies the particular product from among the plurality of products categorized in the product class uniquely identified by the CID; and
  a processor facilitating a commercial transaction involving the product uniquely identified by the GUID, wherein the CID and PID collectively provide the GUID.

32. The server of claim 31, wherein a repository identifier (RID) uniquely identifies a particular seller of the product uniquely identified by the GUID according to an electronic address associated with the seller.

* * * * *